4 Sheets—Sheet 1.

W. P. DERBY.
Loom.

No. 208,675. Patented Oct. 8, 1878.

Witnesses:
Donn J. Twitchell
Will H. Dodge

Inventor:
W. P. Derby.
by Dodge & Son.
Attys.

4 Sheets—Sheet 2.
W. P. DERBY.
Loom.
No. 208,675. Patented Oct. 8, 1878.
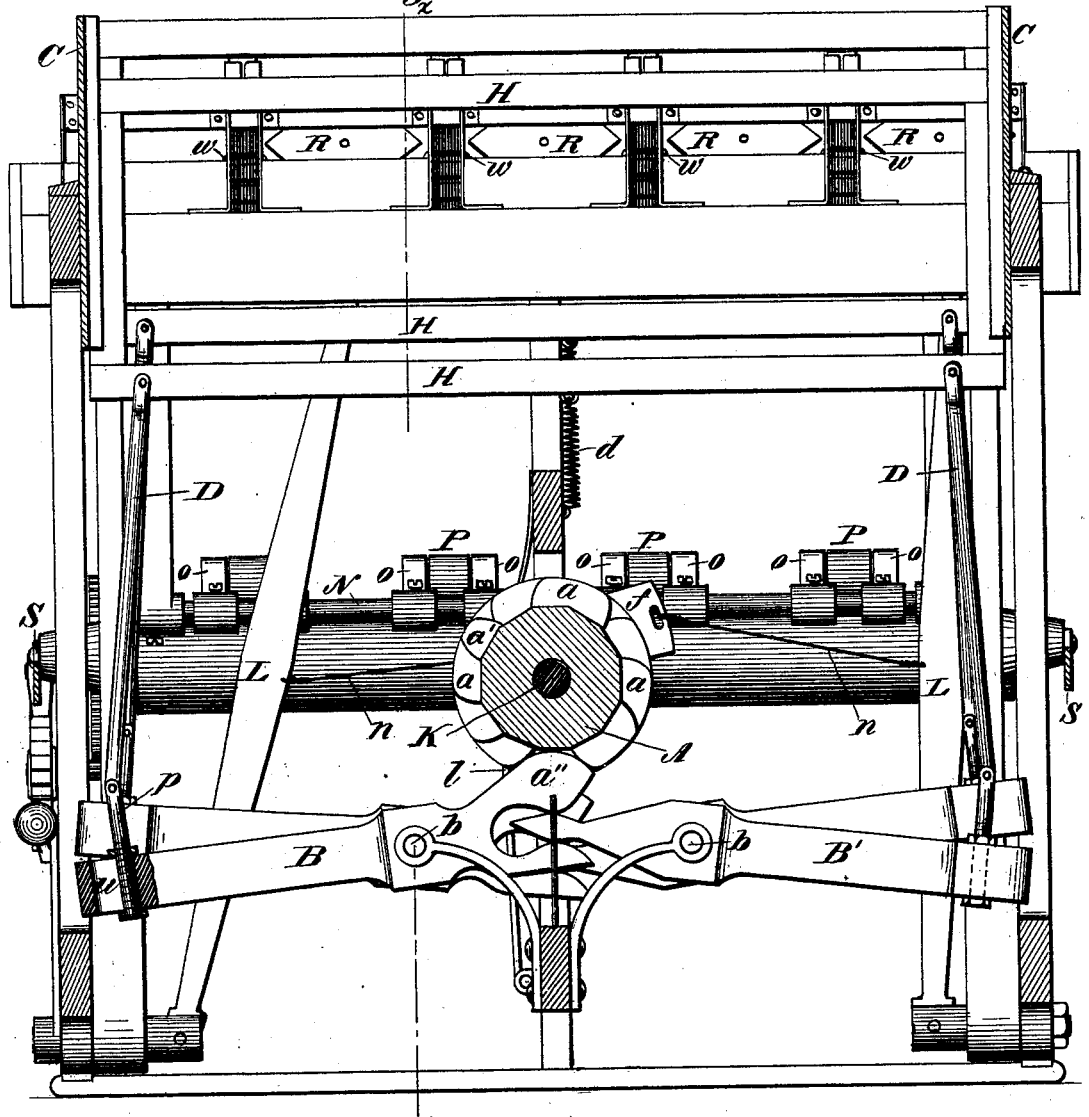
Fig. 2.
Fig. 6. Fig. 7.
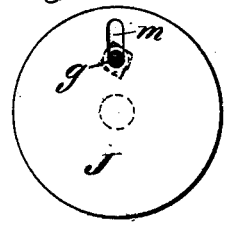
Witnesses:
Donn J. Twitchell
Will H. Dodge
Inventor:
W. P. Derby
by Dodge & Son
Attys.

4 Sheets—Sheet 3.

W. P. DERBY.
Loom.

No. 208,675. Patented Oct. 8, 1878.

Witnesses:
Donn I. Turtchill
Will A. Dodge

Inventor:
W. P. Derby.
by Dodge & Son
Attys.

W. P. DERBY.
Loom.
No. 208,675.        Patented Oct. 8, 1878.
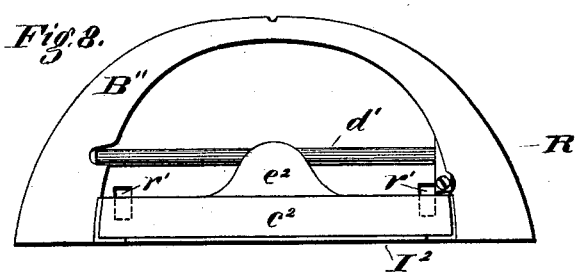
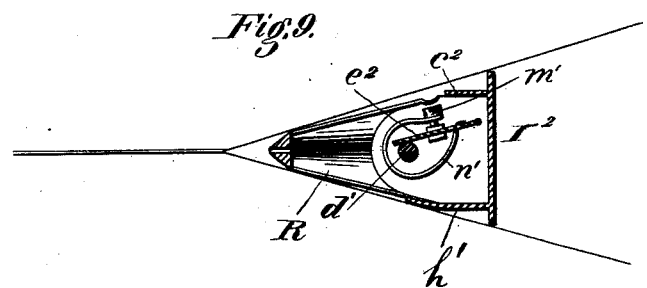
Witnesses:
Donn I. Twitchell
Will H. Dodge.
Inventor:
W. P. Derby,
by Dodge & Son,
Attys.

UNITED STATES PATENT OFFICE.

WILLIAM P. DERBY, OF NORTHAMPTON, MASSACHUSETTS.

IMPROVEMENT IN LOOMS.

Specification forming part of Letters Patent No. 208,675, dated October 8, 1878; application filed April 10, 1877.

*To all whom it may concern:*

Be it known that I, WILLIAM P. DERBY, of Northampton, in the county of Hampshire and State of Massachusetts, have invented certain Improvements in Looms, of which the following is a specification:

My invention relates to that class of looms designed for the production of what are termed "narrow goods," although some of the improvements are applicable to other looms as well.

The invention consists in a novel construction and arrangement of the pattern-roll and its connections with the heddles, together with means for adjusting the movement of the heddles, and also for adjusting the movement of the shuttle.

It further consists in constructing the shuttle wholly of sheet metal, in order to reduce the length of shed necessary for its passage, all as hereinafter more specifically set forth.

Figure 1:
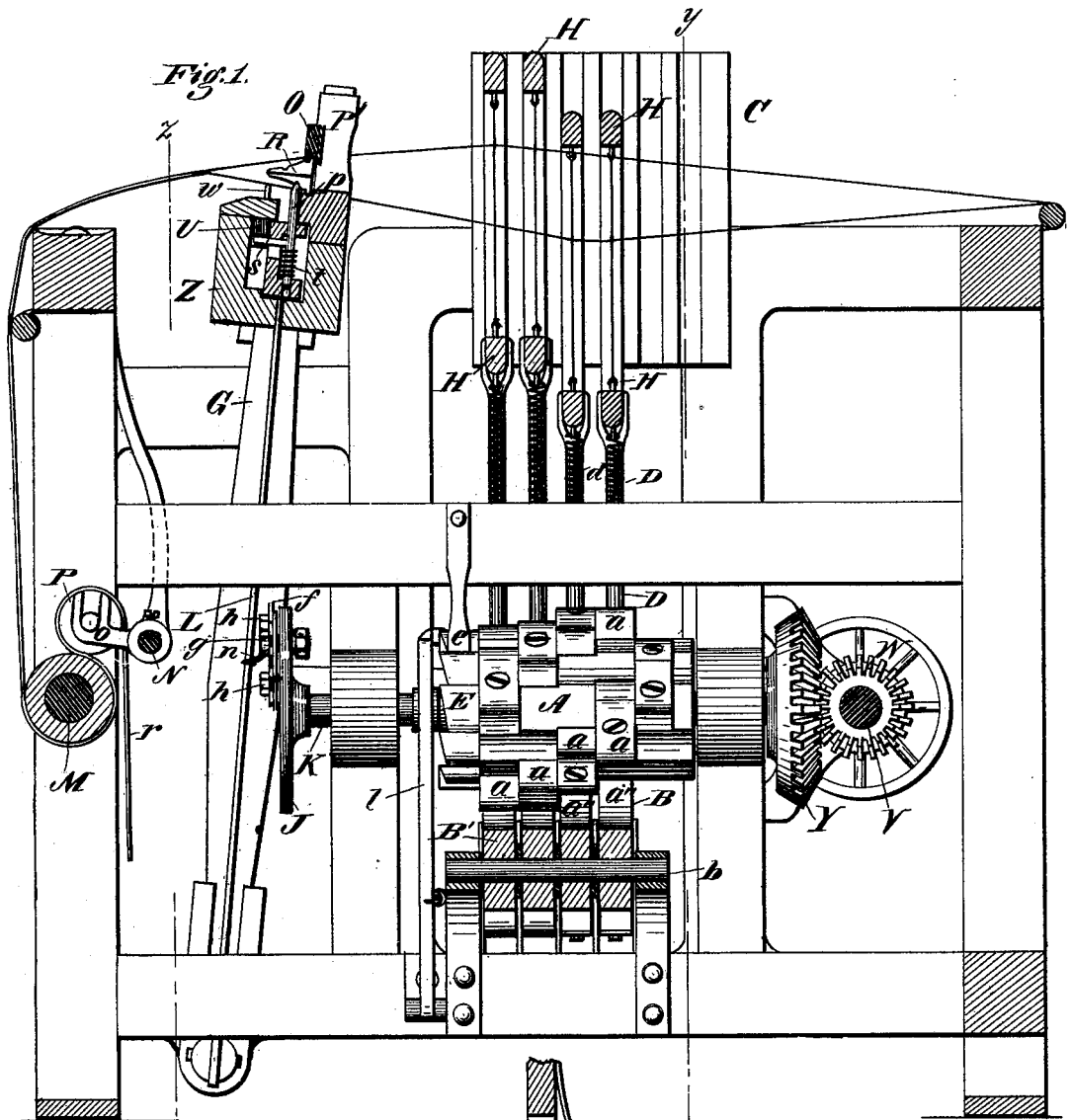
Figure 3:
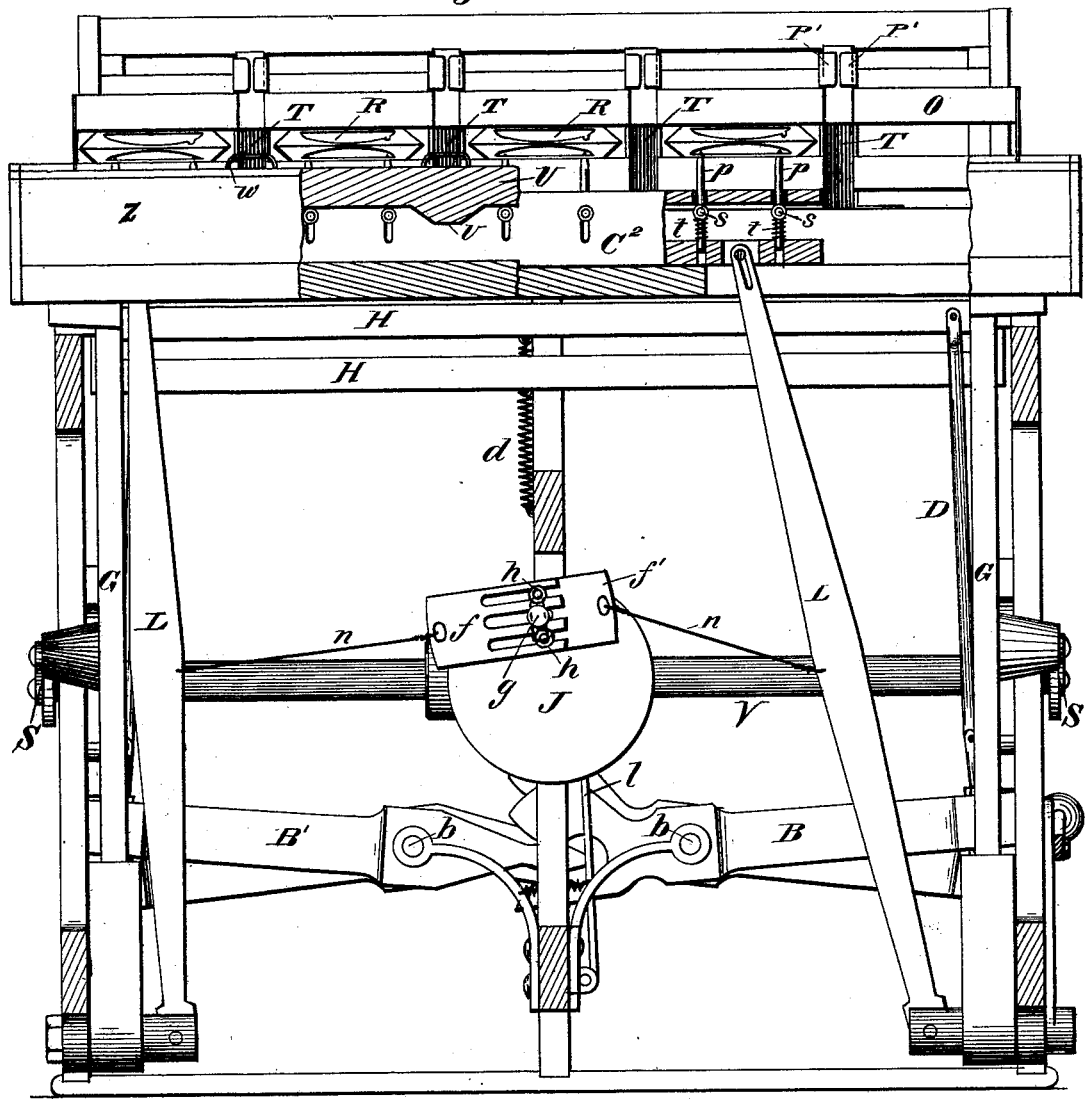

Figure 1 is a longitudinal vertical section taken on the line $x\ x$ of Fig. 2. Fig. 2 is a transverse vertical section on line $y\ y$, Fig. 1, looking from the rear toward the front. Fig. 3 is a similar transverse section on the line $z\ z$, Fig. 1, looking from the front toward the rear; and Figs. 4, 5, 6, 7, 8, and 9 are views of portions shown more in detail.

The object of my invention is to produce a loom of more direct and positive action than heretofore obtained, and which shall be economical in its action and use of power, and on which can be manufactured narrow goods of various widths and kinds, the pattern or style of which may be varied with greater ease and efficiency than heretofore, and by which goods, whether of plain or irregular selvage, (as webbings or edgings,) may be made, thereby adapting the loom to a large variety of goods.

It has also for its object the imparting of a positive direct movement to the heddle-frames, with no lateral motion to strain the warp, and to so construct and drive the shuttles and other parts as to lessen their action, and yet be able to extend the same at will.

To accomplish these results I construct the loom as follows: In a frame of any suitable construction I mount the main driving-shaft V transversely at or near the rear side, and at right angles thereto. In the center part of the frame I mount the pattern-roll A loosely on a shaft, K, as shown in Fig. 1, this shaft K being provided at its rear end with a bevel-gear wheel, Y, which engages with a bevel-gear, W, on the driving-shaft.

The driving-shaft is provided at its ends with eccentrics or crank-pins, which are connected by rods S, Fig. 3, to the lay Z, by which motion is imparted to the latter also.

The pattern-roll A is arranged centrally in the frame, and is polygonal, as shown in Fig. 2, there being secured upon its periphery a series of cams, $a$, of the form shown in Figs. 2 and 6, they being so constructed and arranged on the roll that each shall bear on one or more of its faces, and being secured thereto by simply screwing them fast on the flat faces of the roll, as shown in Fig. 6. Underneath this pattern-roll I arrange two sets of levers, B and B', as shown in Figs. 2 and 3, for operating the heddle-frames H. These levers are pivoted in suitable bearings at $b$, and have their inner ends interlocked, as shown in Fig. 2, so that they must move in accord and with perfect uniformity, being segments of a gear, one of them being provided with a projection, $a''$, for the cam of the pattern-roll to work upon.

Instead of the manner here shown, it is obvious that their inner ends may be interlocked with additional gear teeth or racks meshing together. At their outer ends these levers are slotted, as shown in section at the left-hand side of Fig. 2, and in these slots are secured short vertical rods $p$, provided with nuts, as shown, whereby they can be adjusted longitudinally of the levers and secured at any desired point, so as to give more or less throw to the heddle-frames, to which they are connected by rods D, (shown in Figs. 2 and 3,) with joints to provide for the deflection as the arms are raised by the levers.

The heddle-frames H, as shown in Figs. 1 and 2, are mounted in rigid guides C, which haves grooves for them to slide in.

By this construction and arrangement of the frames and their operating devices, it will be seen they can be brought very close together, and, being operated by rigid connections at either end, are thrown exactly perpendicular, with no lateral motion, hence are moved with greater accuracy and speed than when suspended by harnesses of wire, straps, or cord working over pulleys, &c., while the top girders, binders, pulleys, harnesses, and supports are entirely dispensed with, and the space left free for the use of the weaver, so that most of the warp in the rear of the frames can be reached and controlled by the hand at the front of the loom.

As shown in Figs. 2 and 3, a spiral spring, $d$, connects each frame with the loom-frame, which not only secures a prompt descending of the frame when the support of the lever is removed, but also serves to prevent recoil as the frame is thrown upward.

In order to give the power or capacity to this loom to weave a great variety of patterns, I make the cams $a$, in whole or in part, in sections, as represented in Fig. 6, so that by increasing or decreasing the length of the cam by adding or removing sections $a'$ they can be made to hold the shed open for a greater or less length of time, and thus the design of the goods may be varied at will.

Figure 5:
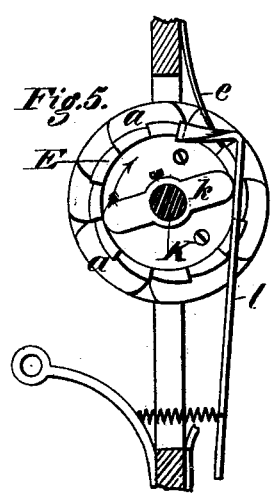

As before stated, this pattern or shedding roll is mounted loosely on the shaft K, and it has an intermittent motion imparted to it by means of ratchet-wheel E, secured rigidly on its front end, and a spring-pawl, $l$, operated by a cam, $k$, secured to the shaft K, as shown in Fig. 5. As there shown, it will be readily understood that, as the shaft rotates, the cam $k$, striking against the pawl $l$, which has its hooked end engaged with one of the teeth of ratchet E, will cause the ratchet, and with it the roll A, to move until the cam $k$ has ceased to operate on the pawl, after which the roll and the frames operated thereby will remain stationary until the cam again strikes the pawl $l$, which, in the meantime, has sprung back and engaged with the next tooth on the ratchet. A stationary spring-pawl, $e$, is arranged to engage with the teeth of the ratchet-wheel on its periphery, so as to prevent any back motion of the roll.

In order to drive the shuttles, I secure on the front end of shaft K a face plate or disk, J, as shown in Figs. 1 and 3. In this plate is a slot, $m$, as shown in Fig. 7, in which I secure a stud or bolt, $g$, by means of nuts, so it can be adjusted at will. I then provide two slotted plates, $f$ and $f'$, which are clamped together by bolts $h$ in such a manner that they can be adjusted longitudinally upon each other at will, thereby increasing or diminishing the length of the central slot as desired. This yoke thus made is secured to or mounted on the face-plate J by having the crank-pin $g$ of the latter inserted through the central slot of the plates $f$ and $f'$ and secured by nuts or key; and from the opposite ends of this yoke I extend a rod or wire, $n$, connecting it on each side to a pivoted vertical rod or bar, L, as shown in Fig. 3. These bars L at their upper ends work through slots in the bottom of the lay, and, as shown in Fig. 3, are pivoted to a longitudinal sliding bar or frame, which serves to give motion to the shuttles, of which any number may be used, according to the width of the goods to be made and size of loom.

This shuttle-carrier $C^2$ may be made of a single bar or of several pieces, as preferred, and has mounted in it a series of vertical pins, $p$, two for each shuttle, these pins being provided with laterally-projecting arms S, as shown in Figs. 1 and 3, having friction-rollers on them, and having spiral springs $t$ (any form of spring or elevating power answering as well) arranged to force the pins upward, their vertical movements being guided by slots in which the arms S work, as shown in Fig. 3.

Within the lay is secured rigidly a bar, U, which has on its lower edge a series of cams or projections, $u$, this bar being arranged so that the arms S of the pins $p$ shall work against its under face or edge, and as they are moved to and fro within the lay will be depressed by the cam $u$, and forced up again by the springs as soon as they have passed the cams. As shown in Fig. 3, these cams $u$ are directly in front of the reeds T, so that at the instant the pins approach the warp they will be drawn down far enough to pass under the same, and the instant they have passed it will rise again, the cam $u$ being of a length corresponding with the width of the reed-space, so that each of the pins $p$, as they pass the cam, shall be forced down out of the way of the warp. These pins are pointed at their upper ends, and are of such a length that when elevated they will enter holes or recesses in the under side of the shuttles R, thereby connecting the shuttles to the carriers, and causing them to move with it to and fro.

It will, of course, be understood that the pins and the cam $u$ are so arranged that but one of the pins shall be made to let go of each shuttle at a time, the other pin retaining its hold until the first has passed the warp, and again taking hold of the shuttle, when the other will strike the cam and be depressed and pass under the warp while the shuttle is being carried along by the first pin, and that thus the pins alternately take hold and let go of the shuttle, one or the other of them being always in contact therewith. By this method of imparting motion to the shuttles, it will be seen that they are never released from the carrier, and that consequently their motion is even and positive, with no recoil or lost motion; while by means of the adjustable crank-pin $g$ the throw of the shuttle can be varied at will, and by means of the adjustable yoke $f$ and $f'$ the shuttle can be made to remain stationary during a greater or less time during which the lay is making its motion, as it is obvious that the longer the slot in the yoke in which the crank-pin $g$ plays the less time will the shuttles be in motion during each stroke of the lay.

In order to protect any loose or slack threads there may chance to be in the warps, I arrange on the lay in front of each reed a bridge, $w$, preferably made of wire, in the form of a wide staple, as shown in Figs. 1 and 3, the result being to prevent any loose threads from dropping down in the way of the pins as they pass, and yet leaving the pins free to view, the face of the lay being left low enough to afford a full view of the pins at all times, so that any fault or failure to operate may be detected and remedy applied.

Figure 4:
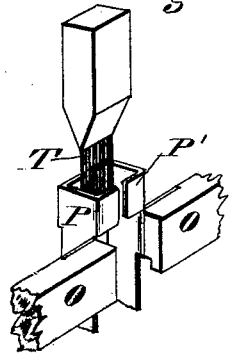

In order to hold the reeds T, I provide a frame consisting of two vertical pieces, P', having flanges to hold the reed, as shown in Fig. 4, these pieces P' being secured to the top of the lay in any suitable way, by which an open space is left between their upper ends, as shown, so that, when necessary for any reason, the reed can be withdrawn without cutting out the warp, thereby saving much time, labor, and stock.

In the reeding in of warps great care has been required to secure the warps exactly central in the reed-space, so that an equal tension may be secured upon each selvage to draw it smooth and uniform.

It is obvious that when goods are woven with an irregular or ornamental selvage the amount of filling or thread from the shuttle will necessarily vary at different strokes of the lay, the wider portion of the fabric requiring more and the narrower portions less.

It is also obvious that, if the backward movement of the lay be so great as to draw off from the bobbin in the shuttle more thread than the movement of the shuttle will draw up, the selvage will be left loose and imperfect. Now, by the peculiar construction of the shuttle, the lay in this loom is required to move but about half the usual distance, and consequently the amount of thread drawn from the shuttle during the backward movement of the lay is correspondingly lessened, so that as the shuttle is thrown the filling-thread is sure to be drawn tight at the edge, thus insuring a perfect selvage, whether the same be regular or irregular in outline.

It is clear that if the length of stroke can be shortened it will take less time and power, and that the strokes can therefore be made more rapidly.

To secure these advantages and obviate the difficulties before mentioned, I have devised a shuttle, to be used in connection with my improved loom, of peculiar construction. This shuttle, which is shown in Fig. 8, is made wholly of sheet metal, its front part, B", being struck up in a die and made V-shaped in cross-section, as shown in Fig. 9. Its back $I^2$ is composed of a single flat piece of metal, brazed or otherwise secured to the part B" at its ends, and a small strip, $c^2$, is secured along the top, and a wider piece, $h'$, along the under side, to give it strength and firmness.

As shown in Fig. 9, the edges of the back piece, $I^2$, project beyond the face of the body or front part, and thus form flanges or guides, which run in corresponding grooves in the shuttle-blocks, as shown in Fig. 1. The front part, B", as shown in Fig. 9, is so bent or folded transversely as to form a much sharper or thinner edge than is customary with the wooden shuttles in general use, which enables it to work close up to the pick-line in shed of warp, as in Fig. 9.

By making its back of the transverse plate $I^2$, in connection with my method of driving the shuttle, I am able to make the shuttle much narrower from front to rear than usual, and by this decrease of its width and making it of such a form as to work close up to the pick-line I am able to reduce the throw of the lay fully one-half. This produces several beneficial results. First, it enables the loom to be run much faster, since the lay can make double the number of strokes in the same time, as it has half the distance to travel, and the shock or vibration on the building by its stoppage and reversal will be materially lessened, while the power will not be materially increased. Second, it is obvious that as the backward motion of the lay is not equal to the length of filling extended from the shuttle-eye to the pick-line on selvage, no filling will be drawn from the quill or bobbin until, in completing its movement on the other side of the shed, the filling is made to draw directly on the selvage, which causes it to pay out just enough for its real want, thereby securing a perfect selvage, even where goods are irregular in outline or improperly reeded in, and thus enabling me to make on my improved loom a class of goods not heretofore made on looms of this character, besides greatly increasing the economy of action, perfection of results, and speed of loom.

The shuttle is furnished with a tension device, consisting of a thin strip of metal, $e^2$, pivoted loosely at its ends within the shuttle, and having a central lip to bear upon the thread on the bobbin, as shown in Figs. 8 and 9. A bent spring, $n'$, secured to the shuttle by a screw, $m'$, has its free end loosely connected with the strip $e^2$, and arranged to bear either side of the center or pivot of the same, as the strip may be turned, thus holding the strip either against the thread or away from the same to permit the removal of the bobbin, as desired. By this arrangement the tension is also decreased, as the draft is increased through the lessening of the thread on the barrel or spindle.

In weaving these goods it is usual to have a friction-roll to rest on take-up roll to bear on the goods and prevent slipping back, as well as to carry the goods off from the take-up roll to boxes.

Much trouble is occasioned by the goods clinging to and winding upon the roll, causing delay and snarling of goods, and at times waste. These rolls are generally connected firmly by a drop to the breast-beam, or else a long roll extending over a section of the loom.

To obviate these difficulties, I provide pressure-rolls P, as shown in Figs. 1 and 2, these rolls being mounted free in slotted brackets or bearings $o$, which latter are attached to a rod, N, and fastened by set-screws, so that they can be secured at any desired point.

By this manner of mounting the rolls P in slotted brackets, it will be seen that they can easily be lifted out of their bearings when desired, and the goods removed from them without delay or damage.

Having thus described my invention, what I claim is—

1. In combination with the heddle-frames H, the pattern-roll A, arranged centrally beneath the same at right angles thereto, and the levers B B, connected at their outer ends with the heddle-frames by the rigid rods D, and having their inner ends jointed to each other and arranged to be acted upon by the roll, as shown.

2. The combination of the heddle-frames H, the operating-levers B B', the jointed adjustable rods D p, and the pattern-roll or equivalent operating device, as shown, for changing the throw of the heddle-frames.

3. The combination and arrangement, substantially as shown and described, of the shaft K, having the cam k rigidly attached, the pattern-roll A, provided with the ratchet E, and the spring-pawl l, all arranged to operate as set forth.

4. In a loom, the adjustable yoke for operating the shuttle, said yoke being composed of the slotted plates f and f', provided with the clamping-bolts and slots for adjusting the same, substantially as described and shown.

5. The combination, in a loom, of the adjustable yoke f f' and the adjustable crank-pin g, said parts being combined and arranged to operate substantially as shown and described.

6. In combination with the lay having the shuttle-driving pins therein, bridges or supports w, arranged upon the lay, substantially as described, for holding the loose threads up out of the way of the pins, as described.

7. The improved shuttle, composed of the V-shaped front and a back consisting of a single thickness of sheet metal, substantially as described and shown, whereby the shuttle is rendered of a narrow width from front to rear.

8. The sheet-metal shuttle having the V-shaped front and the thin back plate $I^2$, extended on the two sides to form supporting-flanges, as set forth.

9. In combination with the take-up roll M, the pressure-roll P, mounted in the open slotted brackets o, adjustably secured to the rod N, substantially as shown and described.

WILLIAM P. DERBY.

Witnesses:
PHILIP T. DODGE,
WILL W. DODGE.